BEST AVAILABLE COPY

2 Sheets--Sheet 1.

AMOS RANK.

Improvement in Stock-Cars.

No. 4,425. Reissued June 13, 1871.

Witnesses'
W. F. C. Rowe
Joe Stayton.

Inventor:-
Amos Rank
by his Atty
Wm. D. Bolduan

AM. PHOTO-LITHOGRAPHIC CO. N.Y. (OSBORNE'S PROCESS.)

2 Sheets--Sheet 2.

AMOS RANK.

Improvement in Stock-Cars.

No. 4,425. Reissued June 13, 1871.

Witnesses:-

W. H. Rowe

Joel Peyton.

Inventor:-

Amos Rank by his Atty

Wm. D. Bolemin

AM. PHOTO-LITHOGRAPHIC CO. N.Y. (OSBORNE'S PROCESS.)

UNITED STATES PATENT OFFICE.

AMOS RANK, OF SALEM, OHIO, ASSIGNOR TO THE NATIONAL CATTLE-CAR COMPANY, OF SAME PLACE.

IMPROVEMENT IN STOCK-CARS.

Specification forming part of Letters Patent No. 111,872, dated February 14, 1871; reissue No. 4,425, dated June 13, 1871.

*To all whom it may concern:*

Be it known that I, AMOS RANK, of Salem, in the county of Columbiana and State of Ohio, have invented certain new and useful Improvements in Railway Stock-Cars, of which the following is a specification:

The improvements constituting the subject-matter herein claimed relate to the following parts of a railway stock-car, namely: the stall-partitions, feed-bins, water-tanks, and troughs; and the specification and claims fully define the invention.

In the accompanying drawing all the improvements constituting the subject-matter of this patent are shown as embodied in a single car; obviously, however, some of these improvements may be used without the others, and the details of their construction may be varied to some extent without departing from the spirit of my invention.

Figure 1:
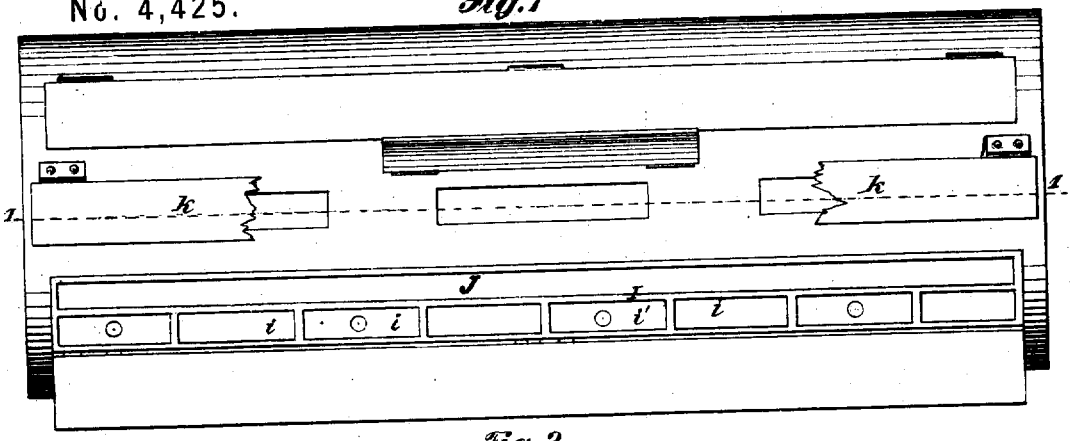
Figure 2:
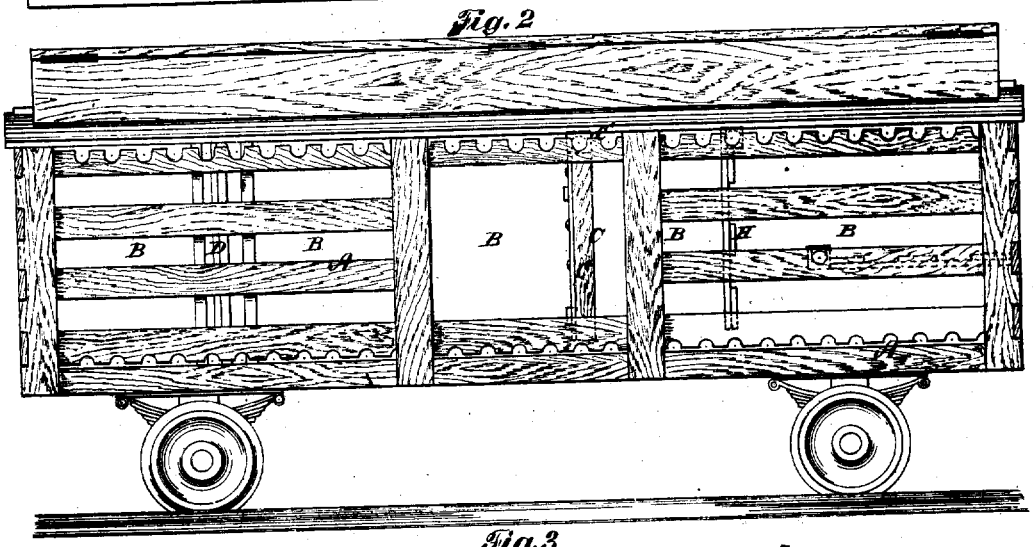
Figure 3:
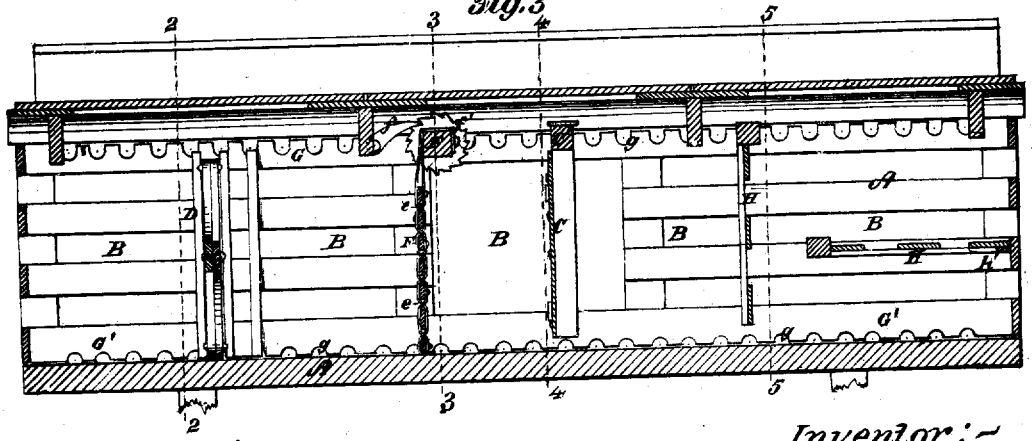
Figure 4:
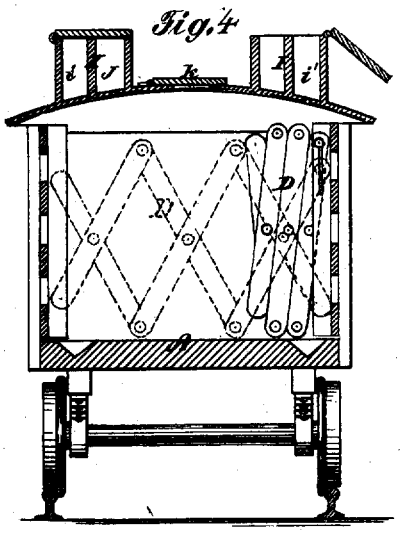
Figure 5:
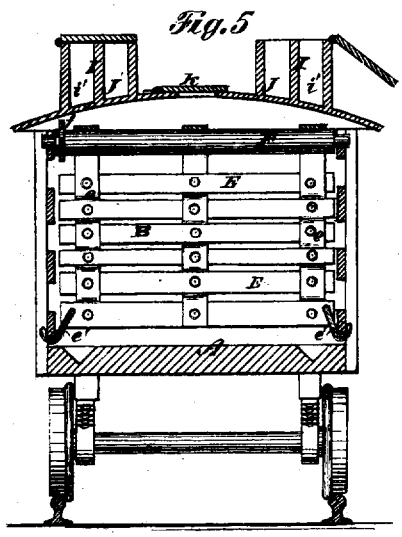
Figure 6:
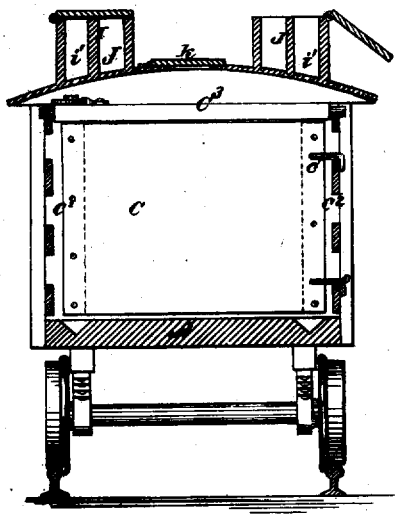
Figure 7:
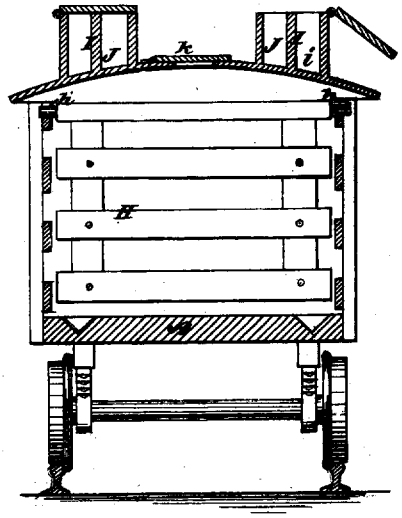

Figure 1 represents a plan or top view of my improved stock-car, with the cover of the water-tank and feed-compartments swung open. The running-board is also shown as lifted or broken away to show the central openings in the roof through which the attendants inspect the stock. Fig. 2 represents a view, in elevation, of the car as seen from one side. Fig. 3 represents a vertical longitudinal central section through the car on the line 1 1 of Fig. 1, showing various styles of adjustable and removable stall-partitions, and my method of converting a single-decked car into a double-decked one. Fig. 4 represents a vertical transverse section through the car on the line 2 2 of Fig. 3, showing the construction of a lazy-tongs stall-partition. Fig. 5 represents a similar section on the line 3 3 of Fig. 3, showing a yielding rolling slatted stall-partition. Fig. 6 represents a similar section at the line 4 4 of Fig. 3, showing a canvas stall-partition. Fig. 7 represents a similar section on the line 5 5 of Fig. 3, showing a swinging slatted partition capable of being converted into a middle deck.

In this instance the body A of the car is shown as mounted on suitable trucks of the usual construction. A slatted car is preferable, but my invention may be adapted to an ordinary box-car; or a car might be constructed with sliding, hinged, or rolling sides, or shutters to admit light and air. The slatted car, in like manner, might be provided with sliding, folding, or rolling sides, to adapt it to use as a car for dead freights. The interior of the car is divided into stalls or compartments B of suitable size, by partitions which may be arranged either longitudinally or transversely relatively to the car. In the drawing, however, transverse partitions only are shown. The lazy-tongs stall-partition D (see Figs. 2, 3, and 4) is composed of a series of bars pin-jointed together at their ends and centers in a way familiar to mechanics. One end of these bars is pivoted to one side of the car, while the corresponding end of its fellow turns on a pin sliding in a slot in the side of the car, to allow the partition to be expanded or contracted. These stall-partitions in this instance are made adjustable to vary the size of the compartment by means of studs *d*, between which the ends of the moving bars of the partition are pivoted, as shown in the drawing. The dotted lines show the position of the partition when extended, and the full lines its position when contracted. The cattle are driven into the stalls when the partition is contracted. It is then extended across the car and secured by proper hooks or catches.

Instead, however, of being secured to one side of the car, the bars might be pivoted either to the roof or to the floor, or they might be allowed to enter recesses left in either for that purpose, and be let down, drawn up, or swung in to position, as desired, and be secured in either position, as above mentioned.

I am aware that a lazy-tongs grating has been used for gates, as well as for a connecting-bridge between two railway cars, and do not, therefore, broadly claim such grating. I am not aware, however, that such a partition has been constructed and combined with a railway stock-car previous to my invention in the manner shown by me, as by my mode of construction I avail myself of the lateral flexibility of the bars to prevent injury to the stock.

The adjustable rolling stall-partition shown in Figs. 3 and 5 is composed of horizontal slats E, united by vertical bands or straps *e*, of some flexible material, such as leather or strong cloth. This partition in this instance winds upon a windlass, F, provided with a retaining-pawl, *f*, and ratchet *f'* to hold the partition when wound up, or when fastened down in position for use. The partition is fastened down by hooks *e'* hooking into staples or under the slats of the car.

The windlass might be arranged vertically on one side of the car, and the slats also be arranged vertically instead of the construction shown; but the arrangement first described is deemed more convenient. Under this arrangement the size of the stalls may be varied by shifting the windlass from one set of notches, *g*, to another, these notches being formed in longitudinal strips or bars G arranged on each side of the car near the roof. Similarly-notched bars G', near the floor, may be used to hold down the partitions. The stall-partition C, shown in Figs. 2, 3, and 6, is formed of canvas winding on a roller, $C^1$, and stiffened by a bar, $C^2$, provided with retaining-hooks *c*. In this instance the roller $C^1$ is arranged vertically, and has its bearings in a bar, $C^3$, resting in the notches *g* above mentioned. A pawl and ratchet hold this partition in any desired position. It is obvious, however, that the canvas partition might be wound on a horizontal roller, as the slatted partition is. This partition, after being wound upon the roller, may be swung up to the roof and secured out of the way. The canvas prevents injury to the animals from the jerking of the cars, and the partition thus constructed is cheap, simple, and easily applied.

Figs. 2, 3, and 7 show a stall-partition, H, constructed like a gate of slats or bars, and swinging from the notched bars G on trunnions *h*, in the manner hereinbefore described. This gate-partition is not only adjustable, but is so constructed that it can be removed and arranged horizontally in the car (see Fig. 3) to form the foundation for a middle deck, which may be either of loose plank or of sheet metal. Projections on the gate may extend between the slats of the car to afford a proper support for the deck; or shoulders may be formed inside the car for that purpose. In this instance the trunnions *h* of the gate rest in notches in the car-slats, while the other ends rest on shoulders *h'*. The covering for the middle deck prevents the soiling of the partitions, and tends to promote the comfort and cleanliness both of the stock and of their attendants.

I am aware that slatted partitions have heretofore been used, but I am not aware of the use of a removable partition convertible into a support for a middle deck prior to my invention.

In order to supply the stock with food and water, I arrange boxes I longitudinally on each side of the car. These boxes project above the roof, and are divided longitudinally by suitable partitions into water-tanks J and feed-bins *i i'*. The bins *i* contain the feed which, when the cattle are to be fed, is deposited into the bins *i'*, which have openings in their bottom (see Fig. 1) leading to suitable feed-troughs below. The lids of the troughs are hinged, so that by lifting them access may be had to all the bins on a side at once. These troughs not only serve as magazines or supplies of food and water for the stock, but also form guards to prevent the attendants from falling off while moving about on top of the car. Openings are formed in the roof of the cars in order that the attendants may inspect the cattle or have access to the interior of the cars, and to increase the ventilation of the cars. These openings are covered by doors or running-boards *k*, hinged so that they may be raised when required. I also propose to arrange water and feed troughs in each stall, said troughs communicating with the supply-chambers J *i i'* above mentioned in any well-known way. Devices for supplying water by a pump from a reservoir below the car are shown in the patent of Rank, Sharp, and King, granted February 14, 1871. In this instance I have shown a longitudinal trough, J, on each side of the car, so that stock may be watered from either side.

I am aware that movable or hinged partitions are shown in the patents of Lee Swearingen, of May 29, 1860, and of John B. Shafer, July 31, 1860, both of which patents also show double decks and places in which feed may be carried. I am also aware that the patents of William Robinson, of October 29, 1861, and of John S. Kendall, of May 25, 1869, and of June 1, 1869, show water-tanks in the roof of a car. I do not, therefore, broadly claim any of these features; but none of these patents show the devices hereinbefore described by me, of which I believe myself to be the inventor.

I claim as my invention—

1. The combination, with a stock-car, of adjustable and flexible or elastic stall-partitions, constructed substantially as hereinbefore set forth, to prevent injury to the stock from the jerking of the cars.

2. The combination, with a stock-car, of adjustable and flexible removable stall-partitions and suspending-rollers or swinging beams mounted in the ceiling of the car, and operating, substantially as hereinbefore set forth, to roll or fold the partitions out of the way.

3. The combination, with a stock-car, of adjustable flexible slatted rolling stall-partitions, constructed substantially as hereinbefore set forth.

4. The combination, with a stock-car, of adjustable rolling or swinging canvas stall-partitions, constructed substantially as hereinbefore set forth.

5. The combination, with a stock-car, of slatted partitions, constructed as described, swinging from the roof of the car, and made removable to serve as a foundation for a middle deck, as set forth.

6. The combination, with a stock-car, of the longitudinal feed-boxes, constructed as described, and divided into compartments, one set of which contains the feed, while the other set communicates with the feed-troughs in the car.

AMOS RANK.

Witnesses:
THOMAS KENNETT,
PETER AMBLER.